United States Patent
Kamps et al.

(10) Patent No.: US 8,588,567 B2
(45) Date of Patent: *Nov. 19, 2013

(54) OPTICAL CABLE AND METHOD FOR PRODUCING AN OPTICAL CABLE

(75) Inventors: Rainer Kamps, Grub am Forst (DE); Dieter Erwin Kundis, Lautertal (DE); Gerhard Merbach, Neustadt bei Coburg (DE); Waldemar Stöcklein, Coburg (DE)

(73) Assignee: CCS Technology, Inc., Wilmington, DE (US)

(*) Notice: Subject to any disclaimer, the term of this patent is extended or adjusted under 35 U.S.C. 154(b) by 8 days.

This patent is subject to a terminal disclaimer.

(21) Appl. No.: 13/446,045

(22) Filed: Apr. 13, 2012

(65) Prior Publication Data

US 2012/0201501 A1  Aug. 9, 2012

Related U.S. Application Data (62) Division of application No. 12/411,458, filed on Mar. 26, 2009, now Pat. No. 8,165,438.

(30) Foreign Application Priority Data

Mar. 26, 2008 (DE) .......................... 10 2008 015 605

(51) Int. Cl.
    *G02B 6/44* (2006.01)
(52) U.S. Cl.
    USPC .......................................... 385/102; 385/100
(58) Field of Classification Search
    USPC ................................. 385/100–114
    See application file for complete search history.

(56) References Cited

U.S. PATENT DOCUMENTS

| | | | |
|---|---|---|---|
| 4,892,382 A | 1/1990 | Story et al. | 350/96.23 |
| 5,148,509 A | 9/1992 | Kannabiran | 385/109 |
| 5,360,497 A | 11/1994 | Schneider et al. | 156/47 |
| 5,422,973 A | 6/1995 | Ferguson et al. | 385/112 |
| 5,561,729 A | 10/1996 | Parris | 385/113 |
| 5,748,823 A | 5/1998 | Nave | 385/113 |
| 5,761,363 A | 6/1998 | Mills | 385/114 |
| 5,822,485 A | 10/1998 | Nelson et al. | 385/112 |
| 5,852,698 A | 12/1998 | Bringuier | 385/113 |
| 6,026,208 A | 2/2000 | Will et al. | 385/128 |
| 6,057,018 A | 5/2000 | Schmidt | 428/36.9 |
| 6,067,394 A | 5/2000 | Ruello et al. | 385/106 |
| 6,259,844 B1 | 7/2001 | Logan et al. | 385/113 |
| 6,487,347 B2 | 11/2002 | Bringuier | 385/113 |

(Continued)

FOREIGN PATENT DOCUMENTS

| | | | |
|---|---|---|---|
| DE | 7705379 | 6/1977 | G02B 5/16 |
| DE | 3545089 | 6/1986 | G02B 6/44 |
| DE | 3608508 | 9/1987 | G02B 6/44 |
| DE | 19605276 | 8/1997 | G02B 6/44 |

OTHER PUBLICATIONS

German Office Action and English Translation of Application No. 102008015605.1, dated Nov. 13, 2008, 12 pages.

*Primary Examiner* — Charlie Peng
*Assistant Examiner* — Mary El Shammaa (57) ABSTRACT

An optical cable comprises a tight-buffered optical cable and a protective sleeve which surrounds the tight-buffered optical cable. An intermediate layer surrounds the protective sleeve has tension-resistant elements. Furthermore, the optical cable contains a cable sheath which surrounds the intermediate layer, and a transitional area facing its inner surface. In this transitional area, the material of the cable sheath is mixed with the tension-resistant elements of the intermediate layer.

34 Claims, 4 Drawing Sheets

(56) References Cited

U.S. PATENT DOCUMENTS

| | | | |
|---|---|---|---|
| 6,496,628 B1 | 12/2002 | Opel et al. | 385/110 |
| 6,553,167 B2 | 4/2003 | Hurley et al. | 385/102 |
| 6,701,047 B1 | 3/2004 | Rutterman et al. | 385/102 |
| 6,714,713 B2 | 3/2004 | Lanier et al. | 385/128 |
| 6,775,443 B2 | 8/2004 | Bringuier et al. | 385/102 |
| 6,775,444 B1 | 8/2004 | Hurley | 385/104 |
| 6,801,695 B2 | 10/2004 | Lanier et al. | 385/100 |
| 6,922,511 B2 | 7/2005 | Rhoney et al. | 385/106 |
| 6,925,235 B2 | 8/2005 | Lanier et al. | 385/100 |
| 7,035,513 B2 | 4/2006 | Mohler et al. | 385/113 |
| 7,113,680 B2 | 9/2006 | Hurley et al. | 385/113 |
| 7,158,707 B2 | 1/2007 | Will et al. | 385/128 |
| 7,184,634 B2 | 2/2007 | Hurley et al. | 385/113 |
| 7,206,482 B2 | 4/2007 | Rhyne et al. | 385/113 |
| 7,231,119 B2 | 6/2007 | Rhoney et al. | 385/100 |
| 7,397,991 B1 | 7/2008 | Register | 385/102 |
| 7,668,427 B2 | 2/2010 | Register | 385/102 |
| 7,995,885 B2 | 8/2011 | Register | 385/102 |
| 8,165,438 B2 | 4/2012 | Kamps et al. | 385/102 |
| 2009/0250241 A1 | 10/2009 | Galletti et al. | 174/110 SR |

OPTICAL CABLE AND METHOD FOR PRODUCING AN OPTICAL CABLE

RELATED APPLICATION

This application is a divisional of U.S. patent application Ser. No. 12/411,458 filed on Mar. 26, 2009 now U.S. Pat. No. 8,165,438, which claims the benefit of priority under 35 U.S.C. 119 to German Application Serial No. 102008015605.1, filed Mar. 26, 2008, the content of which is relied upon and incorporated herein by reference in their entirety.

TECHNICAL FIELD

The present disclosure relates to an optical cable which is particularly suitable for various indoor and outdoor applications. The disclosure also relates to a method for producing an optical cable such as this.

BACKGROUND

The increasing network and the increasingly stringent requirements for data transmission even in the private domestic field are leading to use of optical cables. In addition to regional distribution, the so-called last mile is also becoming increasingly important, where an optical cable connects a distribution station to individual buildings or dwellings. In this case, the primary factor is to use special cables which can be used without any additional measures both within a building and outside a building since this avoids spliced joints or plug connections which are susceptible to faults. So-called "drop cables" such as these can be laid inside and outside buildings, and outside the ground or else as underground cables there.

Cables with different application ranges such as these are intended to satisfy a multiplicity of requirements. On the one hand, the cable should be as light and small as possible in order to allow it to be laid and processed further without any difficulties. Furthermore, it should have as tight a bending radius as possible in order also to be laid with a bending radius of down to 20 mm within buildings. Because of the use of these cables within buildings, the materials used must comply with the appropriate fire protection regulations. Furthermore, it should be possible for the cables to be already provided with plug connectors, in order to speed up the installation process, as prefabricated cable.

A cable such as this for the stated application ranges is subject to widely differing environmental influences. In particular, the resultant temperature differences between a heated building and the outdoor area, which may be considerably cooler, leads to different expansion of the optical cable, as a result of which the optical fiber may be subject to tension loads. One reason for this is the different materials from which a cable such as this is formed. Their expansion behavior can lead indirectly to a change in the attenuation, thus possibly adversely affecting the data transmission rate. In the worst case, for example, the optical fiber can be drawn off completely in the area of a plug connection.

SUMMARY

An optical cable and methods for the production thereof are disclosed in which the cable's shrinkage response is reduced so that it is suitable for a multiplicity of applications inside and outside buildings.

In one refinement, the optical cable comprises a tight-buffered optical cable and a protective sleeve which surrounds the tight-buffered optical cable. An intermediate layer surrounds the protective sleeve and also has a plurality of tension-resistant elements. Finally, the optical cable contains a cable sheath which surrounds the intermediate layer and has a transitional area which faces its inner surface. In the transitional area, the material of the cable sheath is mixed with the tension-resistant elements in the intermediate layer.

This ensures close contact between the cable sheath and the intermediate layer, and the further inner sleeves of the optical cable, thus reducing any undesirable shrinkage process of individual components of the optical cable. In other words, the cable is distinguished in part in that it results in particularly pronounced mechanical coupling of the cable sheath to the protective sleeve, which is ensured in particular by the manufacturing process described further below. The mechanical coupling between the cable sheath and the protective sleeve leads to a more uniform length change of the layers as a function of the temperature.

In another embodiment, an optical cable comprises a tight-buffered optical cable and a protective sleeve which surrounds the tight-buffered optical cable forming a gap. An intermediate layer is also provided, is arranged around the protective sleeve and has tension-resistant elements. A cable sheath is arranged around the intermediate layer and is operatively connected via the intermediate layer to the protective sleeve such that any relative shrinkage of the protective sleeve and the cable sheath after 24 hours with respect to the tight-buffered optical cable is not greater than 3 mm to 5 mm over a cable length of 3 m, and at a temperature of approximately 80° C.

The components, in particular the protective sleeve and the cable sheath, are therefore firmly coupled to one another in the refinement, so that any different expansion behavior has only a minor effect on the tight-buffered optical cable, because of the strong mechanical coupling.

In one embodiment of the method for producing an optical cable, a tight-buffered optical cable is, inter alia, provided and a protective sleeve is extruded around it. The protective sleeve is surrounded by an intermediate layer which has tension-resistant elements. Furthermore, a cable sheath is pressure-extruded around the intermediate layer thus resulting in a transitional area along the inner surface of the cable sheath, in which the material of the cable sheath is mixed with the material of the intermediate layer.

BRIEF DESCRIPTION OF THE DRAWING FIGURES

Various aspects and embodiments will be explained in detail in the following text with the assistance of the drawings, in which.

The invention can be implemented in various ways independently of the described embodiments, and is not restricted to the schematic illustrations. In fact, the figures and the associated description form a basis to explain the various aspects of the invention. The figures have therefore not been drawn to scale, and in fact individual elements are illustrated larger or smaller, for clarity reasons. Components having the same effect and/or function have the same reference symbols.

DETAILED DESCRIPTION

Figure 3:
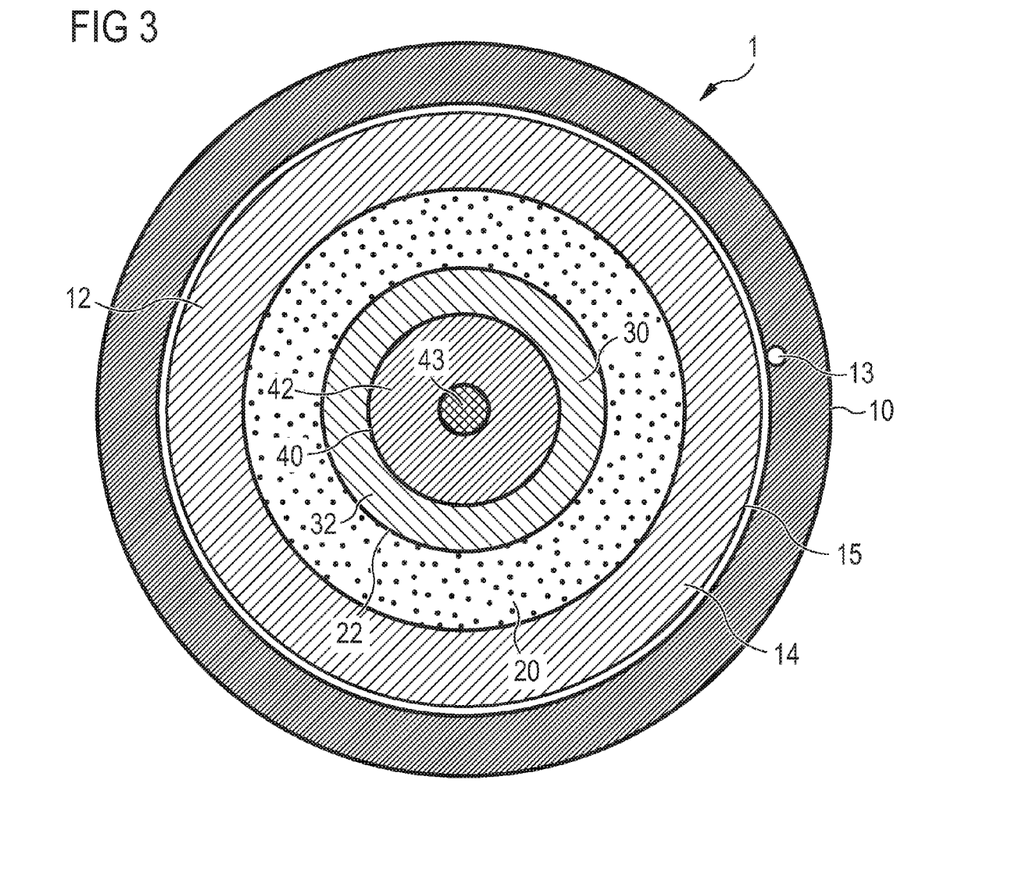
FIG. 3 shows a cross-sectional illustration of one embodiment of an optical cable based on the proposed principle.

FIG. 3 shows a schematic cross-sectional view of an optical cable based on the proposed principle, in which the lateral shrinkage behavior of the individual layers is reduced because of the strong mechanical coupling between the layers. A cable such as this can therefore be processed further and, for example, can be provided with a plug, particularly easily.

In the illustrated embodiment, the optical cable comprises a tight-buffered optical cable 40 which has a waveguide, for example an optical fiber. In the exemplary embodiment, this is illustrated as the fiber 43, in which a fiber core is surrounded by so-called cladding. The cladding is a glass and has a different refractive index to that of the fiber core. In addition, the fiber 43 also contains a protective coating. The fiber 43 is firmly surrounded by a sheath material 42. The sheath material 42 protects the optical fiber 43 and surrounds it completely, resting closely on it. The diameter of the tight-buffered optical cable 40 (TB) in this embodiment is about 900 μm. However, it may also have other values, for example between 400 μm and 900 μm, depending on the size of the fiber core 43 and the material 42 surrounding the core. The sheath 42 may be composed of a material based on silicone, polyvinylchloride, polyester, polyurethane or else other materials.

A protective sleeve 20 is also arranged around the tight-buffered optical cable 40 and in the present exemplary embodiment has a diameter on its inner face 22 which is slightly larger than the corresponding external diameter of the tight-buffered optical cable 40. This results in an essentially annular intermediate space 30, which in the present case has a thickness in the region of 50 μm. In consequence, the internal diameter of the protective sleeve 20 is in the region of 1000 μm.

Polyethylene, polyurethane, polypropylene, polyvinylchloride, polybutylene or else polyvinylchloride or a combination thereof may be used, inter alia, as the material for the protective sleeve 20. Furthermore, polycarbonates and polycarbonate mixtures are suitable, since they have high stiffness. One example of a protective sleeve material is a mixture of polycarbonates and acrylonitrile-butadiene-styrene (ABS).

The annular intermediate space or the gap 30 is filled with a high-viscosity gel 32, which completely fills the intermediate space between the protective sleeve 20 and the tight-buffered optical cable 40. In particular, a gel can be used as the filler material which exhibits only little to no diffusion into the sheath material of the tight-buffered optical cable 40 and into the protective sleeve 20. This reduces damage to or ageing effects on the sheath material of the tight-buffered optical cable 40 and the protective sleeve 20. Furthermore, the viscosity at a temperature of 23° C. should not be less than 4000 mPas (milli-Pascal seconds), in order to achieve adequate mechanical coupling between the protective sleeve 20 and the tight-buffered optical cable 40. Viscosity values of greater than 6000 mPas are expedient.

The resultant intermediate space 30 allows a certain amount of play when a bending load is applied to the optical cable, with the high viscosity of the gel that is present at the same time producing good mechanical coupling between the protective sleeve and the tight-buffered optical cable. The gel therefore also matches the shrinkage behavior of the protective sleeve 20 to the tight-buffered optical cable 40.

Figure 1:
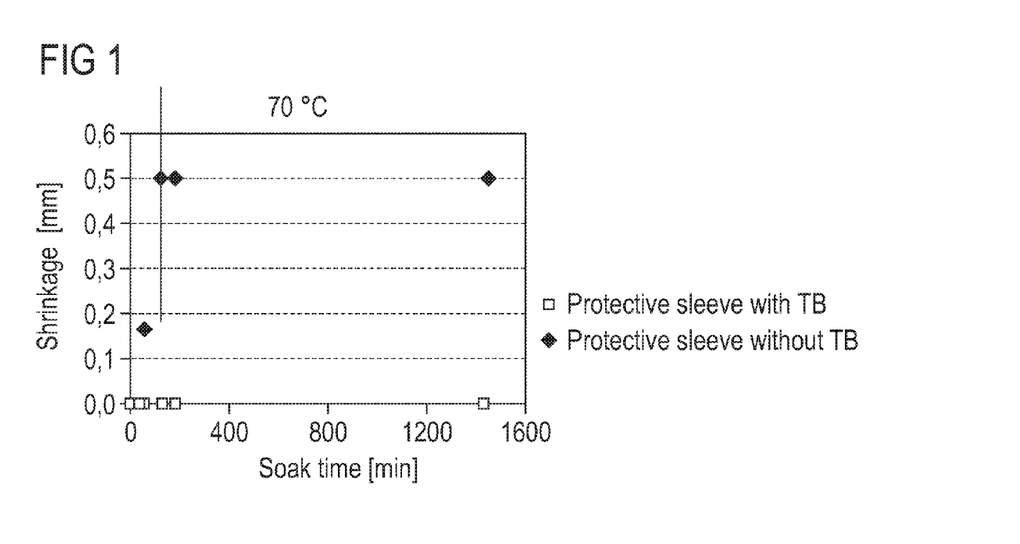
FIG. 1 shows a graph to explain the shrinkage behavior of the protective sleeve in the longitudinal direction of the cable, as a function of the cable soak time.

In this context, FIG. 1 shows a graph which illustrates the common shrinkage behavior of the tight-buffered optical cable with the protective sleeve in comparison to the protective sleeve without the tight-buffered optical cable 40, and therefore without the mechanical coupling between the two elements.

The soak time is plotted in minutes on the abscissa, and the shrinkage behavior in millimeters on the ordinate. The measurements were carried out at a temperature of 70° C. and with a cable length of about 30 cm.

As can be seen, the joint mechanical coupling of the protective sleeve to the tight-buffered optical cable (values: protective sleeve with TB) remains essentially close to zero irrespective of the soak time. The abbreviation "TB" in the following text is short for tight-buffered optical cable. In contrast, the protective sleeve without mechanical coupling to the tight-buffered optical cable (values: protective sleeve without TB) shrinks by about 0.5 mm after a soak time of approximately 200 minutes, over a cable length of about 30 cm.

The filling compound of high viscosity therefore matches the shrinkage behavior of the protective sleeve to the shrinkage behavior of the tight-buffered optical cable, so that the relative change between the protective sleeve 20 and the tight-buffered optical cable 40 is very small.

The protective sleeve 20 is now surrounded by a layer 12 which contains at least one yarn composed of aramide fibers 14. Synthetic polyamides in which at least 85% of the amide groups are directly bonded to two aromatic rings are referred to as aramides or else aromatic polyamides.

The synthetic fiber aramide is distinguished by high strength with respect to a strain or tensile load, as well as resistance to acids and lyes. Furthermore, it is highly resistant to heat and fire, does not melt, but starts to carbonize at about 400° C. The intermediate layer 12 may contain woven aramide fibers and may additionally also have glass-fiber elements. The intermediate layer 12 is used to reinforce the optical cable, in particular for tensile loads, in order to prevent the cable core 43 of the tight-buffered optical cable from breaking or tearing. Apart from fibers composed of aramide, polyvinyl ketones and high molecular weight polyethylenes as well as fiberglass or combinations of them may also be used for this purpose.

Finally, a cable sheath 10 is extruded around the intermediate layer 12 with the aramide fibers 14. This is done by means of pressure extrusion, so that a transitional area 15 is formed on the inside of the sheath surface. In the transitional area 15, the extruded sheath material is mixed with aramide fibers 14 of the outer surface of the intermediate layer 12. This results in strong mechanical coupling between the cable sheath 10, via the intermediate layer 12, and the protective layer 20. The transitional area 15 in which the cable sheath material mixes with the aramide fibers may have a thickness of two tenths of the thickness of the extruded cable sheath.

In addition, a thread 13 is incorporated in the cable sheath 10 and is used to open and to remove the cable sheath before a splicing process, in order to splice the fiber core of the tight-buffered optical cable to an optical waveguide.

The cable sheath 10 is composed of a flame-retardant, non-corrosive material, which is also referred to as FRNC material. Polyethylene or else a mixture with polyethylene and ethylenevinylacetate may be used for the cable sheath. By way of example, aluminum trihydroxide or else magnesium hydroxide are used as flame-retardant materials.

The pressure-extrusion process for producing the cable sheath leads to the cable sheath having considerably less lateral mobility with respect to the protective sleeve 20, which is provided within the cable sheath, and the tight-buffered optical cable 40.

Figure 2:
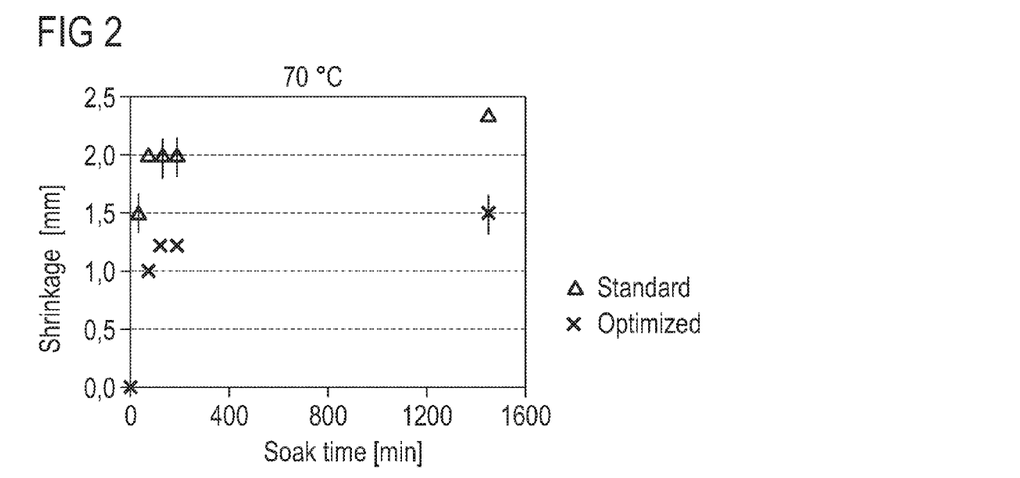
FIG. 2 shows a graph illustrating the lateral shrinkage behavior of an optical cable as a function of the cable soak time.

In this context, FIG. 2 shows an illustration of the shrinkage behavior plotted against the soak time for two cables produced in different ways. The values annotated "standard" were measured with a conventionally produced cable, in which the cable sheath was not connected to the layers located underneath it by means of the pressure-extrusion process as described in detail further below. The "standard" cable is soaked at a temperature of 70° C. After a soak time of about 100 minutes, the shrinkage of the cable sheath rises sharply over a cable length of 1 m and, for example, is 2 mm after a soak time of about 200 minutes. In contrast to this, one produced using the proposed method has a considerably reduced shrinkage behavior, indicated by the values "optimized". These values were determined with a cable based on the proposed production principle, in particular with pressure extrusion of the cable sheath in the conditions stated above.

Because of the mixing, the optical cable exhibits considerably less shrinkage, because of the mechanical binding of the cable sheath to the layers located underneath it, via the intermediate layer. The average shrinkage value of the optical cable based on the proposed principle, in particular of the cable sheath and the protective layer relative to the tight-buffered optical cable, is in the region of 5 mm over a cable length of 3 m, which was soaked at 80° C. for 24 hours and was then measured at room temperature. Conventionally produced cables exhibit shrinkage that is greater by a factor of 3 by comparison.

In other words, the mechanical coupling of the cable sheath to the protective sleeve, and in turn between the protective sleeve and the tight-buffered optical cable, results in the relative length changes of the individual elements being matched to one another. The mechanical coupling therefore leads to a length change, for example because of a shrinkage process or because of a temperature change, affecting all the elements approximately uniformly.

A further aspect therefore also relates to the so-called fiber excess length which is now no longer required, or is scarcely still required, because of the reduced and more uniform shrinkage behavior. The fiber excess length, that is to say the fiber section of the optical fiber which is longer than the surrounding cable sheath or the surrounding protective sleeve, can therefore be less than 0.1% of the overall length. In particular, values of less than 0.05% down to 0% are also possible. The latter value means that the length of the fiber corresponds to the length of the protective sleeve and of the cable sheath.

A plug or a plug connection can be fitted to the end of the cable with the tight-buffered optical cable exposed. This is attached to the cable, for example to the yarn of the intermediate layer for strain relief. Furthermore, it is connected directly to the tight-buffered optical cable. This can now be done without major difficulties since the common and at the same time small expansion of the entire cable prevents the fiber from breaking in the area of the plug. In particular, the cable can therefore be supplied with a plug at the same time.

One alternative approach to determine the mechanical coupling between the individual elements of the cable is to determine the so-called withdrawal force. In this case, the force is measured which is required in order to separate one element of the optical cable from other elements at a specific withdrawal speed. For example, the withdrawal force which is required to pull the fiber core 40 out of the protective sleeve 20 is at least 0.7 N at a pulling speed of 40 to 50 mm/min The withdrawal force is dependent on the filling material 32 used between the protective sleeve 20 and the tight-buffered optical cable 40. The filling material 32 is preferably a gel which results in a withdrawal force of 2 N to 3 N for a cable length of 1 m with a withdrawal speed of 40 to 50 mm/min.

The withdrawal force can be determined in a corresponding manner between the protective sleeve 20 and the cable sheath 10 which surrounds the protective sleeve. This withdrawal force should be in the range from 20 N to 60 N, and in particular in the range from 30 N to 60 N, for a withdrawal speed of 40 to 50 mm/min and a cable length of 1 m. High withdrawal forces such as these can be achieved in particular by the pressure extrusion that is used for production of the sheath around the intermediate layer 12 and the protective sleeve 20.

Figure 4:
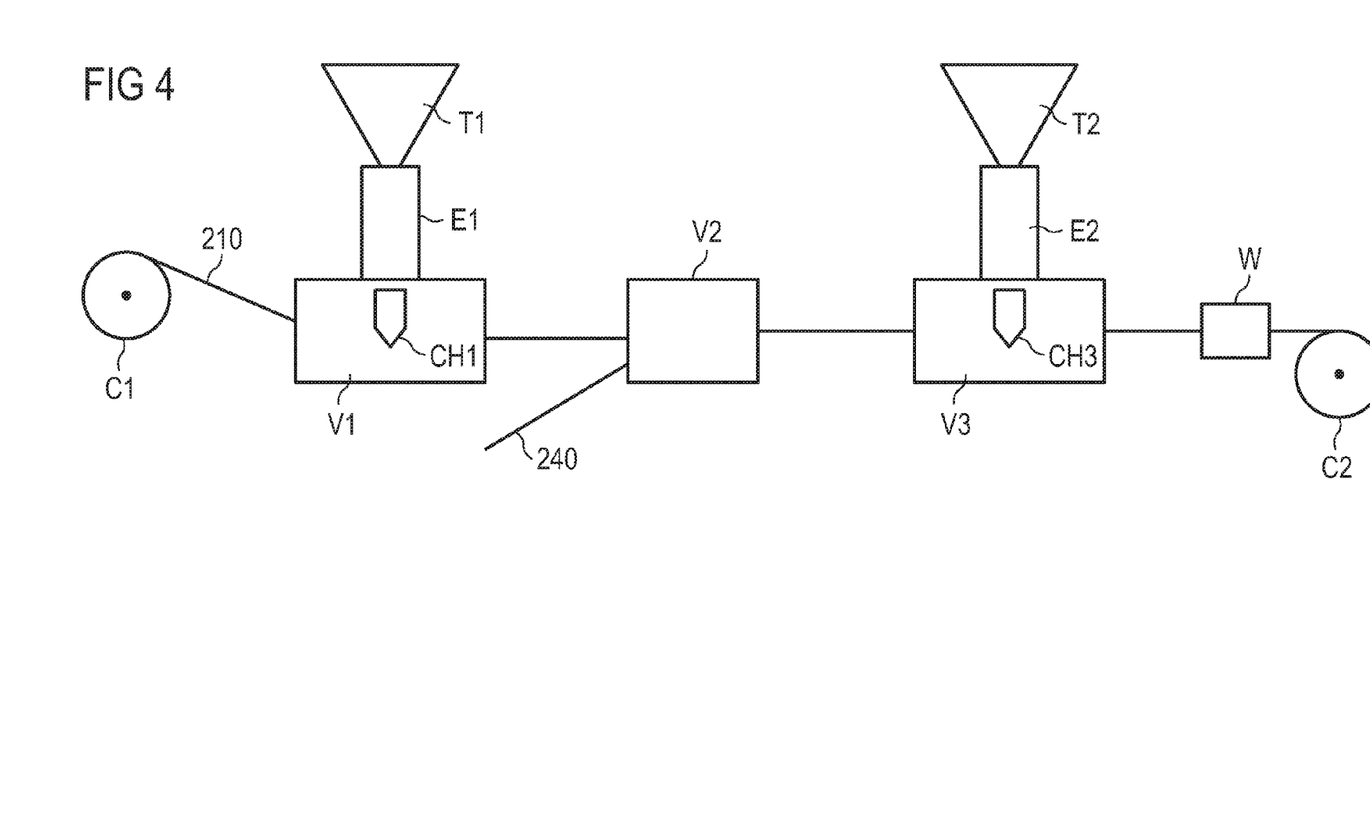
FIG. 4 shows a schematic illustration of a production line in order to explain the production method.

FIG. 4 shows a schematic illustration of a production line for producing an optical cable 10. The production line contains a plurality of individual production units V1, V2 and V3 which are arranged on behind the other. A tight-buffered optical cable 210 is wound on to a spool C1 and is fed to the first manufacturing unit V1. The tight-buffered optical cable 210 has a fiber core and a surrounding sheath material composed of a polymer, and, for example, has a diameter of 500 μm.

The manufacturing unit V1 has a tank T1 which is connected via an extruder E1 to an extruder head CH1. The tank T1 is filled with an extruding material, which forms the raw material for the protective sleeve 20. As an example, materials based on polycarbonates may be used for this purpose and, furthermore, may also have flame-retardant components. Flame-retardant materials can therefore be provided in the raw material itself, or else may be mixed in the extruder material during the extrusion process.

Once the material has been heated in the extruder E1, the hot polymer melt is extruded around the tight-buffered optical cable 210 by means of the extruder head CH1. The extruder head CH1 is in this case set such that a narrow gap 30 is formed between the tight-buffered optical cable 40 and the inside of the protective sleeve 20. The sleeving extrusion which is described in this case and will be described in more detail later on, makes it possible to determine the gap size, which is preferably in the region of a few tens of micrometers, in particular in the region of 50 μm.

Furthermore, the manufacturing unit V1 has provision for a filling material to be introduced into the gap between the tight-buffered optical cable 40 and the protective sleeve 20. In the present exemplary embodiment, the filing material is a high-viscosity gel with a viscosity in the range from 4000 mPas to 12000 mPas, measured at a temperature of 23° C. In one particular embodiment, a material is used whose viscosity is at least 6000 mPas or greater, measured at 23° C. Alternatively, yarns or other materials can also be introduced into the protective sleeve or into the gap, for support.

The extruded protective sleeve is cooled down in the production unit V1 thus resulting in a stiff protective sleeve which is mechanically well coupled to the tight-buffered optical cable. The partially produced and cooled-down cable is then fed to the second production unit V2. This now surrounds the protective sleeve 20 with a yarn composed of high tensile strength material 240, thus forming the intermediate layer 12 as shown in the exemplary embodiment in FIG. 3.

By way of example, aramide, polyvinylketone or else very long-chain polyethylenes can be used for this purpose. In addition, the fiber-glass fibers can be interwoven for further mechanical robustness. The robustness elements are preferably arranged symmetrically around the protective sleeves 20, and are operatively connected to the protective sleeve.

The further production unit V3 is connected to the production unit V2 and comprises a second tank T2 which is connected via a second extruder E2 to a further extruder head CH3. The extruder head CH3 is designed for pressure extrusion.

The cable emerging from the production unit V2 is fed to the extruder head CH3. At the same time, the sheath material in the tank T2 is heated via the extruder E2, and the hot melt is forced at high pressure in the extruder head CH3 around the cable passing through the extruder head. The melt is therefore brought into contact with the intermediate layer in the extruder head itself. The pressure extrusion process results in the hot cable material being mixed with the aramide and/or glass fibers of the intermediate layer in a transitional area of the cable sheath, and leads to good mechanical coupling and to the better shrinkage behavior.

The cable emerging from the extruder head CH3 is then cooled in a water bath W and is wound up on the second roller C2. In this case, however, no further tensile load is applied, in contrast to sleeving extrusion, and, instead, the cable sheath is provided with its predetermined shape essentially by the opening in the extruder head CH3. From the point of view of a molecular structure, pressure extrusion in the extruder head CH3 reduces alignment of the polymer chains in the sheath material so that the morphology of the sheath material comes closer to an unoriented equilibrium distribution. If necessary and desired, the cable is then also provided with a terminating plug.

In the illustrated exemplary embodiment, the production line is continuous, that is to say the cable is manufactured in a continuous process. However, it may be worthwhile interrupting the process illustrated in FIG. 4 in order to allow the cable or the cable core to come to rest and if appropriate to wait for production-dependent shrinkage processes. For this purpose, by way of example, the cable can be wound on to a further drum, which is not illustrated, and may be stored briefly after each production unit, in particular after the production unit V1. This allows the cable core, that is to say the tight-buffered optical cable surrounded by the protective sleeve, to assume its final shape after the first production step. Furthermore, this makes it possible to compensate for different production speeds between the individual production units V1, V2 and V3.

Figure 5A:
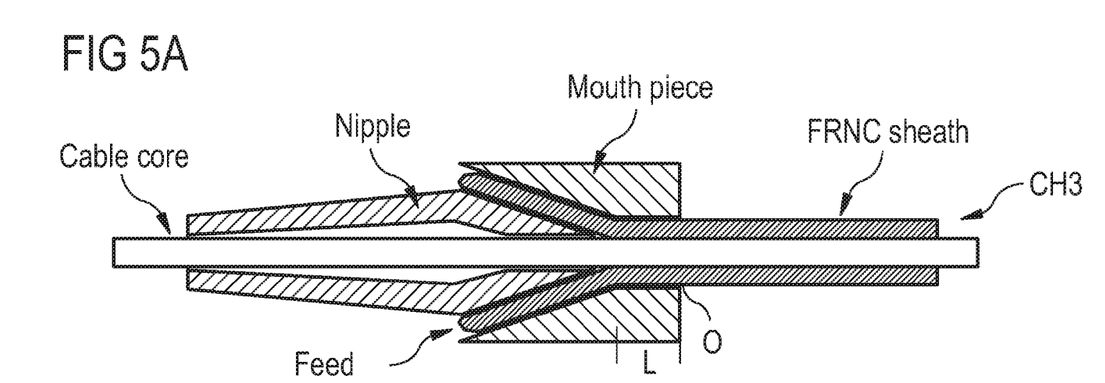
FIGS. 5A and B show a schematic illustration of extrusion heads in order to explain different extrusion options.

In this context, FIG. 5A shows a cross-sectional view of the extrusion head CH3 for pressure extrusion. The extrusion head CH3 comprises a nipple, which tapers conically, and is provided with an opening in the front area. The diameter of the opening of the nipple corresponds essentially to the diameter of the cable core passing through, comprising the tight-buffered optical cable, the protective sleeve and the intermediate layer. A mouth piece is fitted to the nipple and its opening so that this results in a conically tapering feed for the sheath material between the nipple and the mouth piece. The mouth piece is designed such that the sheath material which is introduced through the feeds is pressed firmly on to the cable core and is guided jointly along a section L as far as an opening O. The opening O of the mouth piece has a diameter which corresponds essentially to the external diameter of the desired cable. In other words, the sheath material is pressed on to the cable core in the area L within the mouth piece, thus resulting in mixing in the transitional area of the cable sheath. The cable emerging from the extruder head is then cooled in the water bath.

Figure 5B:
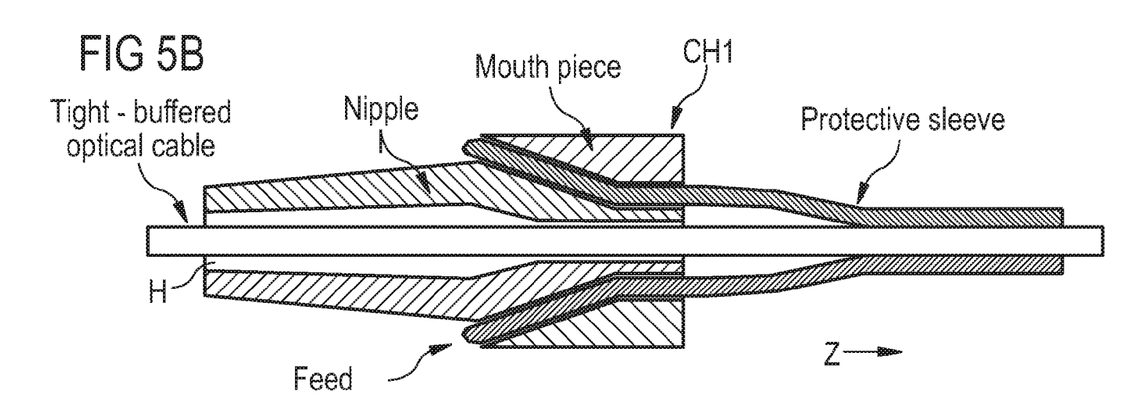

In contrast, FIG. 5B shows an exemplary embodiment for sleeving extrusion, as is used by way of example in the extruder head CH1. A nipple is likewise provided there, through which the cable is passed. In the present case, this is the tight-buffered optical cable. In contrast to the pressure-extrusion head CH3, the opening in the nipple also forms the opening in the extruder head CH1. Furthermore, the material of the protective sleeve is extruded via a further mouth piece, which is placed around the nipple. In this case, the diameter of the annular opening of the mouth piece is designed such that the extruded material does not come into direct contact with the cable core. The annular diameter of the opening of the mouth piece is designed such that the opening in the nipple is placed in the opening of the mouth piece.

In consequence, the protective sleeve material does not make contact with the tight-buffered optical cable until after leaving the extrusion head. This is done by the protective sleeve material and the tight-buffered optical cable being drawn along the illustrated Z-direction.

In the sleeving extrusion head CH1, the outlet opening of the nipple has a slightly larger diameter than the tight-buffered optical cable. This is used to bring gel that has been introduced into the cavity H into contact with the tight-buffered optical cable, so that the tight-buffered optical cable is coated with a thin gel layer. When the tight-buffered optical cable is then drawn through the nipple in the direction of the opening, the gel forms a thin layer on the surface of the tight-buffered optical cable, and leaves the extruder head CH1 in this way.

The material of the protective sleeve is then not applied directly to the tight-buffered optical cable but to gel surrounding the tight-buffered optical cable. This results in the extruded protective sleeve having a slightly larger internal diameter, thus forming a gap between the protective sleeve and the tight-buffered optical cable, in the region of 50 μm, for example. This allows a small amount of play for the tight-buffered optical cable within the protective sleeve, and prevents the tight-buffered optical cable from sticking to the protective sleeve, thus resulting in undesirable attenuation. At the same time, the tight-buffered optical cable is kept in a straight line and is not curved within the protective sleeve.

A mixture of polycarbonates with acrylonitrile-butadiene-styrene can be used as the material for the protective sleeve, and can also be provided with flame-retardant components. For example, in addition, aluminum trihydroxide or magnesium hydroxide making up a proportion by weight of up to 60% can be introduced into the matrix of the protective sleeve. This is also done in the area of the feeds to the extruder head, in which the cable sheath material is mixed with the flame-retardant components.

The described cable design can be used as a "drop cable" for indoor and outdoor applications. In this case, it complies with the size and flexibility requirements. The stiff protective sleeve protects the tight-buffered optical cable against external pressure and allows even small bending diameters to be achieved. Furthermore, the shrinkage behavior of the individual layers is reduced because of the good mechanical coupling of the layers to the tight-buffered optical cable. This allows the cable to be coupled directly to an appropriate plug connection without any need to divide additional reinforcing elements or adapters. In this case, the tight-buffered optical cable and the stiff protective sleeve likewise improve the connection to a plug.

The optical cable is more robust than the previously used connecting cables, and is at the same time more flexible to handle than previous solutions. It can be used not only indoors but also outdoors in various external conditions without the shrinkage behavior resulting in unacceptable and an additional optical attenuation.

What is claimed is:

1. An optical cable, comprising:
   a waveguide;
   a protective sleeve surrounding the waveguide;
   an intermediate layer surrounding the protective sleeve and having tension-resistant elements; and
   a cable sheath surrounding the intermediate layer and having a transitional area that faces an inner surface of the sheath and in which a material of the cable sheath is mixed with the tension-resistant elements of the intermediate layer, wherein
   the transitional area comprises 0.1% to 20% of the thickness of the cable sheath.

2. The optical cable of claim 1, wherein the transitional area comprises 10% to 20% of a thickness of the cable sheath.

3. The optical cable of claim 1, wherein the intermediate layer includes at least one of glass fibers and a yarn composed of aramide fibers.

4. The optical cable of claim 1, wherein the material of the cable sheath comprises a flame-retardant, non-corrosive material.

5. The optical cable of claim 4, wherein the material of the cable sheath has polyethylene and aluminum trihydroxide or polyethylene and magnesium hydroxide.

6. The optical cable of claim 1, further comprising a gap between the waveguide and the protective sleeve, the gap having a thickness in the range from 30 to 100 μm.

7. The optical cable of claim 1, wherein the internal diameter of the protective sleeve is not greater than 1000 μm.

8. The optical cable of claim 1, wherein the waveguide is part of a tight-buffered optical cable, and wherein an external diameter of the tight-buffered optical cable is about 900 μm.

9. The optical cable of claim 1, further comprising a gel with a viscosity of greater than 4000 mPas at a temperature of 23° C. located between the protective sleeve and the waveguide.

10. The optical cable of claim 9, wherein the viscosity of the gel is in the range of 6000 mPas to 12000 mPas at a temperature of 23° C.

11. The optical cable of claim 1, wherein the protective sleeve is operatively connected via the intermediate layer to the cable sheath such that any relative shrinkage of the protective sleeve and of the cable sheath with respect to the tight-buffered optical cable after 24 hours is not greater than 3 mm to 5 mm over a cable length of 3 m and at a temperature of approximately 80° C.

12. The optical cable of claim 1, wherein the waveguide is part of a tight-buffered optical cable, and wherein the tight-buffered optical cable and the protective sleeve make contact with one another such that a withdrawal force exerted on the tight-buffered optical cable or on the protective sleeve is not less than 0.7 N at room temperature and with a withdrawal speed in the range from 40 mm/min to 50 mm/min, over a cable length of 1 m.

13. The optical cable of claim 12, wherein the withdrawal force is in the range of 2 N to 3 N.

14. The optical cable of claim 1, wherein the protective sleeve and the cable sheath are operatively connected to one another via the intermediate layer such that a withdrawal force on the protective sleeve from the cable sheath is in the range of 30 N to 60 N at room temperature and at a withdrawal speed in the range from 40 mm/min to 50 mm/min, over a cable length of 1 m.

15. An optical cable, comprising:
   a waveguide;
   a protective sleeve surrounding the waveguide forms a gap;
   an intermediate layer surrounding the protective sleeve and has tension-resistant elements; and
   a cable sheath around the intermediate layer and operatively connected to the protective sleeve via the intermediate layer such that any relative shrinkage of the protective sleeve and of the cable sheath with respect to the waveguide after 24 hours is not greater than 3 mm to 5 mm over a cable length of 3 m and at a temperature of approximately 80° C.,
   wherein a withdrawal force of the protective sleeve from the cable sheath is in the range from 30 N to 60 N at room temperature and with a withdrawal speed in the range from 40 mm/min to 50 mm/min, over a cable length of 1 m.

16. The optical cable of claim 15, wherein the tension-resistant elements comprise aramide fibers.

17. The optical cable of claim 15, wherein a material of the cable sheath and the tension-resistant elements are mixed in a transitional area between the intermediate layer and the cable sheath.

18. The optical cable of claim 17, wherein the transitional area comprises 0.1% to 20% of the thickness of the cable sheath.

19. The optical cable of claim 17, wherein the gap has a thickness in the range of 45 μm to 55 μm and an internal diameter of the protective sleeve is in the range of 800 μm to 1200 μm.

20. The optical cable of claim 15, further comprising a filling compound in the gap, the filling compound comprising a gel with a viscosity of greater than 6000 mPas at a temperature of 23° C.

21. An optical cable, comprising:
   a tight-buffered optical cable;
   a protective sleeve surrounding the tight-buffered optical cable;
   an intermediate layer surrounding the protective sleeve and having tension-resistant elements; and
   a cable sheath surrounding the intermediate layer and having a transitional area that faces an inner surface of the sheath and in which a material of the cable sheath is mixed with the tension-resistant elements of the intermediate layer, wherein
   the transitional area comprises 0.1% to 20% of the thickness of the cable sheath.

22. The optical cable of claim 21, wherein the transitional area comprises 10% to 20% of a thickness of the cable sheath.

23. The optical cable of claim 21, wherein the intermediate layer includes at least one of glass fibers and a yarn composed of aramide fibers.

24. The optical cable of claim 21, wherein the material of the cable sheath comprises a flame-retardant, non-corrosive material.

25. The optical cable of claim 24, wherein the material of the cable sheath has polyethylene and aluminum trihydroxide or polyethylene and magnesium hydroxide.

26. The optical cable of claim 21, further comprising a gap between the tight-buffered optical cable and the protective sleeve.

27. The optical cable of claim 21, wherein an internal diameter of the protective sleeve is not greater than 1000 μm.

28. The optical cable of claim 21, wherein an external diameter of the tight-buffered optical cable is about 900 μm.

29. The optical cable of claim 21, further comprising a gel with a viscosity of greater than 4000 mPas at a temperature of 23° C. located between the protective sleeve and the tight-buffered optical cable.

30. The optical cable of claim 29, wherein the viscosity of the gel is in the range of 6000 mPas to 12000 mPas at a temperature of 23° C.

31. The optical cable of claim 21, wherein the protective sleeve is operatively connected via the intermediate layer to the cable sheath such that any relative shrinkage of the protective sleeve and of the cable sheath with respect to the tight-buffered optical cable after 24 hours is not greater than 3 mm to 5 mm over a cable length of 3 m and at a temperature of approximately 80° C.

32. The optical cable of claim 21, wherein the tight-buffered optical cable and the protective sleeve make contact with one another such that a withdrawal force exerted on the tight-buffered optical cable or on the protective sleeve is not less than 0.7 N at room temperature and with a withdrawal speed in the range from 40 mm/min to 50 mm/min, over a cable length of 1 m.

33. The optical cable of claim 32, wherein the withdrawal force is in the range of 2 N to 3 N.

34. The optical cable of claim 21, wherein the protective sleeve and the cable sheath are operatively connected to one another via the intermediate layer such that a withdrawal force on the protective sleeve from the cable sheath is in the range of 30 N to 60 N at room temperature and at a withdrawal speed in the range from 40 mm/min to 50 mm/min, over a cable length of 1 m.

* * * * *